US011847586B2

(12) United States Patent
Borras et al.

(10) Patent No.: US 11,847,586 B2
(45) Date of Patent: *Dec. 19, 2023

(54) METHOD AND APPARATUS FOR DETERMINING A ROAD USAGE CHARGE

(71) Applicant: GeoToll, Inc., Plantation, FL (US)

(72) Inventors: Jaime Andres Borras, Miramar, FL (US); Wyatt Drake Geist, Davie, FL (US)

(73) Assignee: GEOTOLL, INC., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,282

(22) Filed: May 9, 2023

(65) Prior Publication Data

US 2023/0281681 A1    Sep. 7, 2023

Related U.S. Application Data

(60) Continuation of application No. 16/451,587, filed on Jun. 25, 2019, now Pat. No. 11,645,684, which is a division of application No. 14/077,974, filed on Nov. 12, 2013, now Pat. No. 10,373,215.

(51) Int. Cl.
| | |
|---|---|
| *G06Q 30/0283* | (2023.01) |
| *H04W 4/48* | (2018.01) |
| *H04W 4/029* | (2018.01) |
| *H04W 84/18* | (2009.01) |
| *H04W 4/46* | (2018.01) |
| *H04W 64/00* | (2009.01) |
| *H04L 67/12* | (2022.01) |

(52) U.S. Cl.
CPC ........ *G06Q 30/0284* (2013.01); *H04W 4/029* (2018.02); *H04W 4/46* (2018.02); *H04W 4/48* (2018.02); *H04L 67/12* (2013.01); *H04W 64/006* (2013.01); *H04W 84/18* (2013.01)

(58) Field of Classification Search
CPC ...... G06Q 30/0284; H04W 4/46; H04W 4/48; H04W 4/029; H04W 64/006; H04W 84/18; H04L 67/12
USPC .......................................................... 705/13
See application file for complete search history.

(56) References Cited

U.S. PATENT DOCUMENTS

| | | | |
|---|---|---|---|
| 2012/0105197 A1* | 5/2012 | Kobres | G06Q 30/06 340/5.2 |
| 2013/0031029 A1* | 1/2013 | Davidson | G07C 5/0825 705/417 |

OTHER PUBLICATIONS

"Electronic Toll Collection System based on Global Positioning System Technology" Published by IEEE (Year: 2010).*

* cited by examiner

*Primary Examiner* — Zeina Elchanti
(74) *Attorney, Agent, or Firm* — The Concept Law Group, PA; Scott M. Garrett; Scott D. Smiley

(57) ABSTRACT

A method and apparatus for determining a distance travelled by a vehicle for the purpose of assessing and settling a road usage charge allows for determining a distance travelled with a vehicle. A mobile device can acquire odometer values which are subsequently reported to a system that confirms the distance drive and determines a road usage charge. Once the actual distance travelled by the vehicle is determined by the system, a road usage charge can be determined. Fuel excise taxes paid by the vehicle operator for fuel used by the vehicle and tolls can be subtracted from the road usage charge to determine a road usage settlement amount that can be paid from, or refunded to a financial account associated with the vehicle.

17 Claims, 5 Drawing Sheets

METHOD AND APPARATUS FOR DETERMINING A ROAD USAGE CHARGE

CROSS REFERENCE

This application is a continuation of U.S. patent application Ser. No. 16/451,587, filed Jun. 25, 2019 and granted on May 9, 2023 as U.S. Pat. No. 11,645,684, which was a divisional of U.S. patent application Ser. No. 14/077,974, titled "Method and Apparatus for Determining a Road Usage Charge," filed Nov. 12, 2013, the entireties of each of which are hereby incorporated by reference.

FIELD OF THE DISCLOSURE

The present disclosure relates generally to vehicular systems, and more particularly to determining the distance traveled by vehicle on public roads for determining a road usage charge to be assessed.

BACKGROUND

For some time governments have been funding road maintenance and roadway projects at least in part using excise taxes assessed on fuel (e.g. gasoline). Typically there is a per gallon tax on fuel that is paid by vehicle operators. The tax includes national, state, and often municipal assessments. The taxes are collected upon sale and paid to the respective governmental entities. The revenue is then used to fund various projects relating to vehicular travel on public roadways.

Vehicle manufacturers have been improving the efficiency of vehicles to increase their mileage, typically expressed in miles per gallon in the U.S. Conventional engines have been improved, and hybrid electric vehicles are increasingly common. In addition, there are now a significant number of electric-only vehicles, which use no petroleum fuel, being sold. As a result of less fuel being bought, the excise tax revenues are insufficient to continue funding road projects and maintenance. Accordingly, governments are looking for alternative means of raising revenue.

One alternative that governments, including many state governments, are considering is a road use charge, which assesses a fee based on the distance driven, rather than on the amount of fuel purchased. These proposals call for the installation of a "black box" into a vehicle that uses global positioning satellite (GPS) technology to determine how far vehicle has been driven. This proposal has been met with concerns over privacy, however. Many people do not feel comfortable with the notion of being "tracked" by the government.

Accordingly, there is a need for a method and apparatus for determining a road usage charge that addresses privacy concerns.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
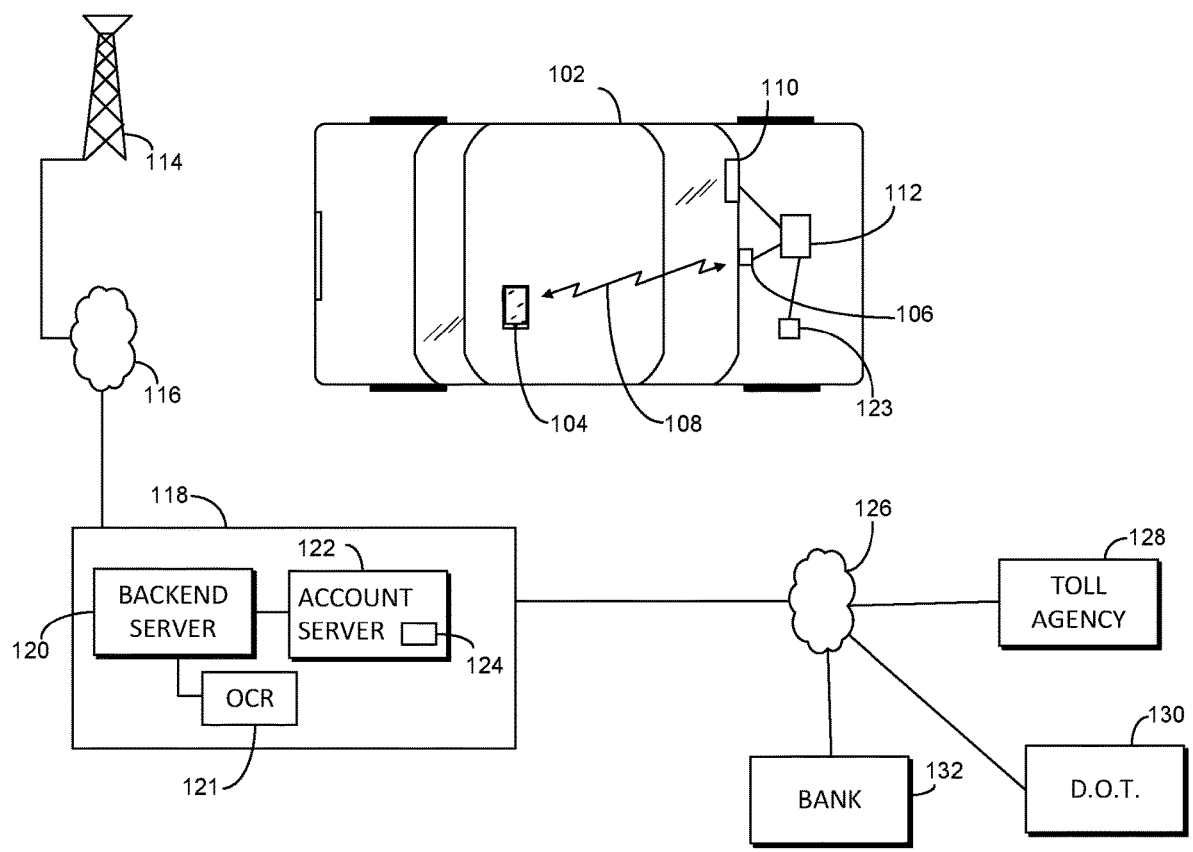
FIG. 1 is a system diagram of road usage charge system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments include a method for determining a vehicular road usage charge comprised of detecting, by a mobile phone, a beacon transmitted over personal area network (PAN) by a vehicle. The mobile device pairs with the vehicle over the PAN and determines, based on information received from the vehicle upon pairing with the vehicle, that the vehicle is associated with a financial account managed by a remote server and that is further managed by the mobile device. The mobile device determines movement of the vehicle and a distance the vehicle has moved while paired with the vehicle over the PAN. The mobile device reports a distance travelled over a period of time by the vehicle to the remote server. The method also includes receiving at the mobile device, from the remote server, and responsive to reporting a distance travelled over the period of time, a settlement amount for a road usage charge for an actual distance travelled as determined by the financial account server based on the reported distance.

FIG. 1 is a system diagram of road usage charge system 100 in accordance with some embodiments. The distance travelled by a vehicle 102 is used to determine a road usage charge to be assessed and paid by the vehicle operator. In particular, settlement of the road usage charge is performed by a service operator 118 which maintains a financial account 124 associated with the vehicle 102. The financial account includes information about the vehicle 102, the operator or owner of the vehicle 102, and a monetary balance held in trust for payments associated with the vehicle 102. In some embodiments the service 118 can be a toll service that pays vehicular tolls from the account 124 for the vehicle 102. A mobile device 104 can be used to access and interact with the system 118 and account 124, and to report information to the system 118 indicating the distance travelled by the vehicle 102. Distance information can be acquired by the mobile device 102 and reported to the system 118 in a number of ways.

Once an account 124 is established, the mobile device, by performing code for a suitable application, can detect the vehicle by a personal area network (PAN) beacon transmitted by a PAN transceiver 106 of the vehicle. A PAN is a short range wireless communication protocol. The PAN transceiver, in addition to other information, will transmit its media access control (MAC) address, which is a unique, hard-coded address that is provided by the manufacturer of the PAN transceiver. The PAN can use a protocol such as that specified by the Institute of Electrical and Electronic Engineers (IEEE) specification 802.15, commercial implementations of which include that known by the trade name "BlueTooth." Upon detecting the vehicle's PAN 106 from, for example, a beacon or other transmitted signal intended to allow other devices to discover the PAN 106, the mobile device 104 can "pair" with the vehicle. Pairing refers to establishing a link between the mobile device 104, and the PAN transceiver 106 using the PAN protocol. Given that the PAN operates at a short range, and is only available when the vehicle 102 is turned on, the mobile device 104 can infer that it is substantially co-located with the vehicle 102 upon the mobile device 104 pairing with the vehicle 102 using the vehicle PAN 106. Accordingly, while paired with vehicle 102, the mobile device can determine, in some embodiments, movement of the vehicle 102. For example, in some embodiments, the mobile device 104 can be equipped with a satellite positioning receiver, such as a global positioning satellite (GPS) receiver. Using a mapping function or application of the mobile device 104, the mobile device can determine its position, and hence the distance it has moved while paired with the vehicle 102. The mobile device 104 can record distance information, and report it to the system 118 periodically, or as an event-driven action.

The mobile device 104 can be a small computing device having several radio transceivers to support different forms of wireless communication and reception of signals. For example, present day "smart phones" commonly have a BlueTooth transceiver, a wireless local area network (WLAN) transceiver, a cellular transceiver, and a GPS receiver, and use an operating system that allows a user to load and install application programs, such as a road usage application, or an application including a road usage component, into the phone. The mobile device can access and report information to the system over a cellular system 114, that can allow access to a public wide area network 116, such as the Internet. The cellular system can be any of the presently operated cellular telephony communication systems, and can provide both voice and data services. The system 118 includes one or more servers, such as, for example, a backend server 120 and an account server 122. The backend server 120 can provide administrative and other services while the account server maintains the financial account 124 associated with vehicle 102 or mobile device 104.

The vehicle 102 also includes and odometer 110 as part of its instrumentation. The odometer is a display of the total distance the vehicle has been driven, and can be controlled, for example, by a vehicle computer 112. In some embodiments the vehicle computer 112 can communicate odometer information to the mobile device via the PAN 106. In some embodiments the mobile device is equipped with a camera, as is common, and can capture an image of the odometer 110 at different times and transmit the odometer images to the system 118. The system 118, at one of the servers of the system 118 such as a backend server 120 using an optical character recognition (OCR) engine 121, can process the odometer images using optical character recognition, to determine the odometer value in each image. Distance travelled by the vehicle can be determined by comparing the distance values in different odometer images. The system 118, upon determining an actual distance the vehicle has been driven, can determine a road usage charge corresponding to the distance driven. For example, the system 118 can access a governmental agency, such as department of transportation (DOT) server 130 to determine present road usage rates. In some embodiments a road usage charge can be settled by debiting the account 124 by the road usage charge amount. The account 124 can be replenished with funds from a bank 132, as can be arranged by an operator of the vehicle 102. In some embodiments, in addition to determining the road usage charge for the distance driven, the system 118 or the DOT 130 can determine a fuel tax paid by the operator of the vehicle 102. The fuel tax can be determined by separate fuel receipt reporting where the operator of the vehicle reports actual receipts for fuel purchased for the vehicle. The accuracy of the reported fuel receipts can be verified by an estimated fuel consumption rate (e.g. distance driven per unit of fuel) for the vehicle type of the vehicle. For example, the DOT server 130 can maintain a list of vehicles by manufacturer and model, and an estimated fuel consumption rate for each model of vehicle. A fuel tax can then be determined from the determined for the distance driven based on the estimated fuel consumption rate. In some embodiments, the vehicle fuel pump 123 be used to determine an amount of fuel used by the computer 112 of the vehicle 102, which can transmit the amount of fuel pumped by the pump via a PAN 106 or WLAN (not shown) to the mobile device 104, which can report the fuel consumption to the system 118.

Since road usage charges are intended to replace fuel excise taxes, the operator of the vehicle can be refunded the difference of the fuel tax and the road usage charge to the account 124 if the fuel tax is higher by the DOT 130, or the account 124 can be debited for the difference if the road usage charge is higher than the fuel tax, rather than paying the entire fuel tax. In some embodiments the system 118 can be a privately operated toll service system that uses the account 124 to settle tolls accrued by the vehicle with a toll agency 128. One example of such a toll system is taught in co-pending and commonly assigned U.S. patent application Ser. No. 13/360,479, titled "Method and Apparatus for Facilitating a Wireless Transaction Event via a RFID Tag Device with a Mobile Device," the entirely of which is hereby incorporated by reference. Thus, the account 124 can be used to pay taxes, road usage charges, as well as to receive refunds when fuel taxes exceed road usage charges. All transactions with the account 124 can be reported to the mobile device 104 by the system 118 so that the user of the mobile device 104 can see the status of the account and all transactions.

Figure 2:
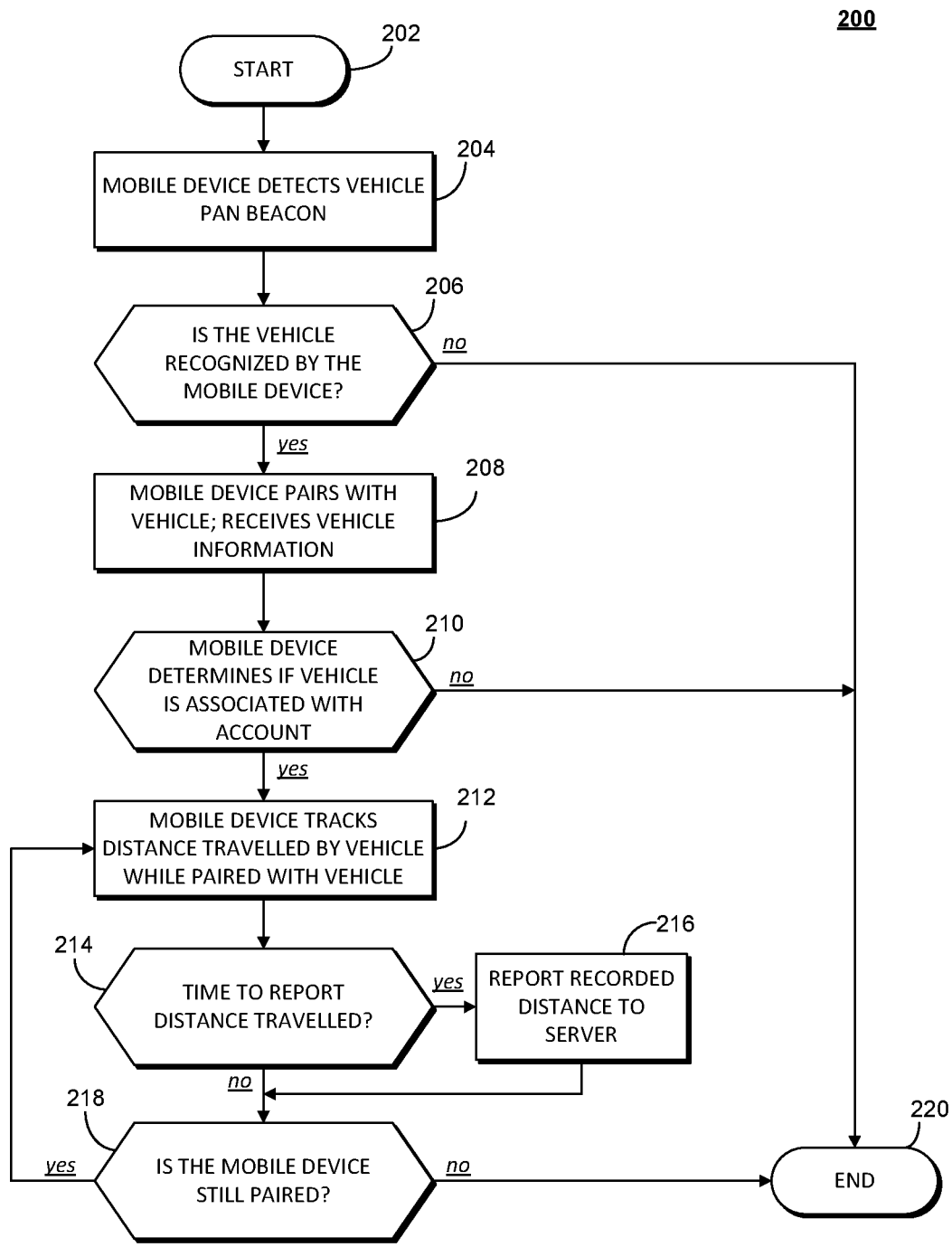
FIG. 2 is a flow chart diagram of a method of determining a road usage charge in accordance with some embodiments.

FIG. 2 is a flow chart diagram of a method 200 of determining a road usage charge in accordance with some embodiments. The method is performed by a mobile device, such as a smart phone performing an application designed in accordance with the teachings herein. At the start 202, the mobile device is powered on, and the application can be executing as a background process. Upon the vehicle being turned on, the vehicle PAN will transmit a beacon or signal that is detected by the mobile device in process 204. In process 206, the mobile device determines whether the vehicle, as indicated by information provided in the transmission, is a device with which the mobile device has previously established a link. If the vehicle is recognized by the mobile device, the mobile device then pairs with the vehicle over the PAN in process 208. In process 210 the mobile device determines if the vehicle is associated with an account, meaning a financial account managed cooperatively by the mobile device and a backend system such as system 118 of FIG. 1. If the vehicle is recognized by the mobile device as one that is associated with an account managed by the mobile device, the mobile device can the commence tracking the distance travelled by the vehicle in process 212. The distance travelled can be determined, for example, by use location information acquired from a GPS receiver of the mobile device. In some embodiments the vehicle can provide odometer information to the mobile device over the PAN. For example, every unit of distance travelled (mile, kilometer) can trigger the vehicle to report a new odometer reading to the mobile device. At various times as determined in process 214, the mobile device can report distance travelled to the system in process 216. Processes 212, 214, and 216 can be repeated while the mobile device is paired with the vehicle, as indicated by process 218. If the mobile device is no longer paired with the vehicle, such as when the vehicle is turned off, or if in process 210 the vehicle is not associated with an account managed by the mobile device, or if in process 206 the mobile device does not recognize the vehicle, the method 200 can end 220. The distance information reported by the mobile device in method 200 can be used by the system to determine a road usage settlement amount (e.g. a total road usage charge, or a difference from a fuel tax paid for fuel to operate the vehicle).

Figure 3:
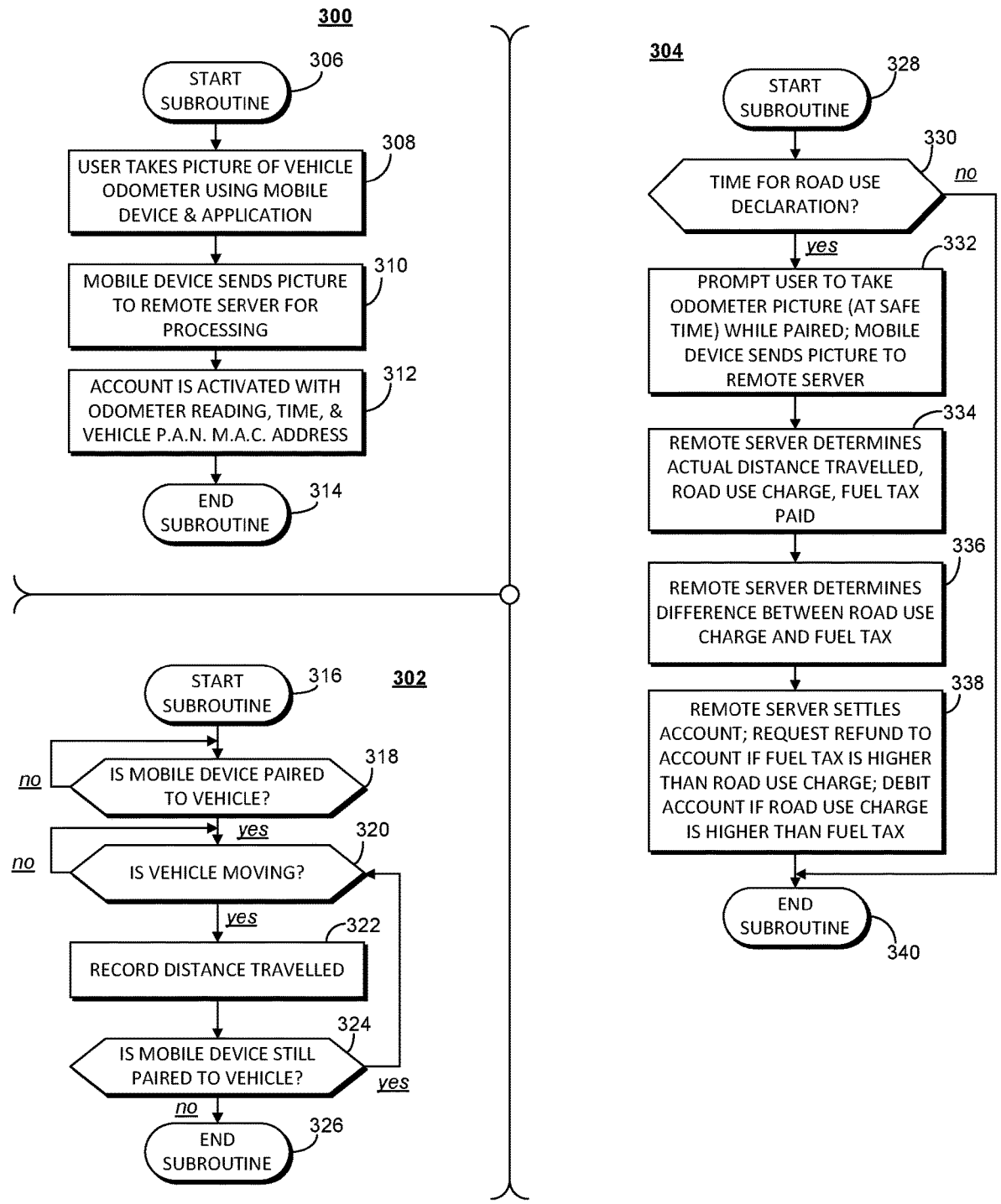
FIG. 3 is a flow chart diagram of a method of determining a road usage charge in accordance with some embodiments.

FIG. 3 is a flow chart diagram of a method 300 of determining a road usage charge in accordance with some embodiments. The method 300 is represented by three different subroutines 300, 302, 304, which can be performed and repeated at different times of the method 300. In addition, or alternatively the distance information reported by the mobile device in method 200 of FIG. 2, the mobile device can be used to capture an image of the actual odometer of the vehicle while it is paired with the vehicle. Being paired with the vehicle gives some assurance that the image is of the odometer of the vehicle with which it is paired. Odometer images can be transmitted by the mobile device to the system server for processing, where the odometer values can be determined from the images, and compared to determine an actual distance travelled by the vehicle. By using odometer information, cases where the mobile device does not travel with the vehicle, and therefor does not, for example track movement of the vehicle using GPS location information, will not prevent determining an actual distance travelled by the vehicle.

Subroutine 300 shows an initial routine. At the start 306 the mobile device is powered up, the road usage or toll application is instantiated in the mobile device, and the device and vehicle are paired over the vehicle's PAN. In process 308 the user uses the mobile device's camera, as operated by the application, to capture an image of the vehicle's odometer. The device can then send the odometer image to the remote server in process 310 for the server to process and extract a distance value from the image using, for example, optical character recognition (OCR). In process 312, if an account is being established, an account is activated. The odometer value, time, vehicle PAN MAC address and other information can be stored in the mobile device and the remote server, and the initial subroutine ends 314.

In subroutine 302, the mobile device determines the distance travelled by the vehicle. Subroutine 302 can therefore include many elements of method 200 of FIG. 2. Subroutine 302 can be performed one or more times after subroutine 300. A preliminary check in process 318 checks to ensure that the mobile device is (still) paired with the vehicle. If not, the subroutine 302 can wait for the device to be paired with the vehicle (e.g. a vehicle for which an account has been established and is in part managed by the mobile device). In process 320 the mobile device determines whether the vehicle is moving, such as by GPS location information, accelerometer output, odometer information being provided by the vehicle to the mobile device via the vehicle PAN, and so on. When the vehicle is moving, the mobile device records the distance travelled by the vehicle from location, odometer or other information. Processes 320, 322 are repeated while the device is paired, as indicated by process 324. When the device is no longer paired, the subroutine ends 326.

Subroutine 304 can be periodically or occasionally performed, even while subroutine 302 is also being executed, and assumes that subroutine 300 has been performed successfully at least once at the start 328. At process 330 the subroutine determines whether it is time to determine the road use charge. If so, the mobile device can prompt the user to capture another odometer picture while the mobile device is paired with the vehicle. The prompt can be in response to a message transmitted to the mobile device from the remote server or system, or it can be scheduled. The prompt informs the user of the mobile device to capture a second or subsequent odometer image while the mobile device is paired with the vehicle's PAN. The prompt can instruct the user to capture the image while the vehicle is not moving. The image can be captured using the application, which can ensure that the mobile device is paired with the vehicle and it can operate the camera of the mobile device. Upon capturing the second odometer image, the mobile device transmits the second odometer image to the system 118, for processing. At process 334 the remote server processes the received subsequent image to obtain the distance value and determines the actual distance travelled by the vehicle. The mobile device can, in some embodiments, send distance information as well, based on GPS location information, for example. However, given that the mobile device may not always travel with the vehicle, or that the mobile device can be turned off while travelling with the vehicle, the distance information determined by the mobile device may be unreliable. Distance values from the odometer images can be treated as being more reliable since the mobile device can verify the time and date the images were taken, and that the mobile device was paired with the vehicle, as indicated, for example, by the MAC address of the vehicle PAN transceiver, when the odometer images are taken. The server can also, once the actual distance travelled by the vehicle is determined, determine the road usage charge, and fuel tax paid by the operator of the vehicle for the same distance interval or for the same period of time over which the distance travelled by the vehicle has been determined. The road usage charge can be determined, for example, based on a set rate, or by the server contacting a DOT server to obtain road usage charge information. The fuel tax paid can be determined, for example, from receipts reported by the vehicle operator, directly from the vehicle fuel pump, or by an estimated tax based on the known ratio of distance per unit of fuel consumption. In process 336 the server can determine the difference between the road use charge and the fuel tax paid, and in process 338 the server can credit the account associated with the vehicle, if the fuel tax is higher, by, for example, communicating the fuel tax and road use charge to the DOT server and requesting a refund. The refund can be credited to the account associated with the vehicle. In some embodiments the account can be a toll account maintained by a toll service, from which toll charges are paid by the toll service to a toll agency on behalf of the operator of the vehicle. Alternatively, if the road use charge is higher than the fuel tax paid, the system can use the account to pay the balance due to the DOT by contacting the DOT server with the road usage settlement amount for a transaction. Once the road usage settlement amount has been determined and settled, the subroutine ends 340, and the method can return to subroutine 302, for example.

Figure 4:
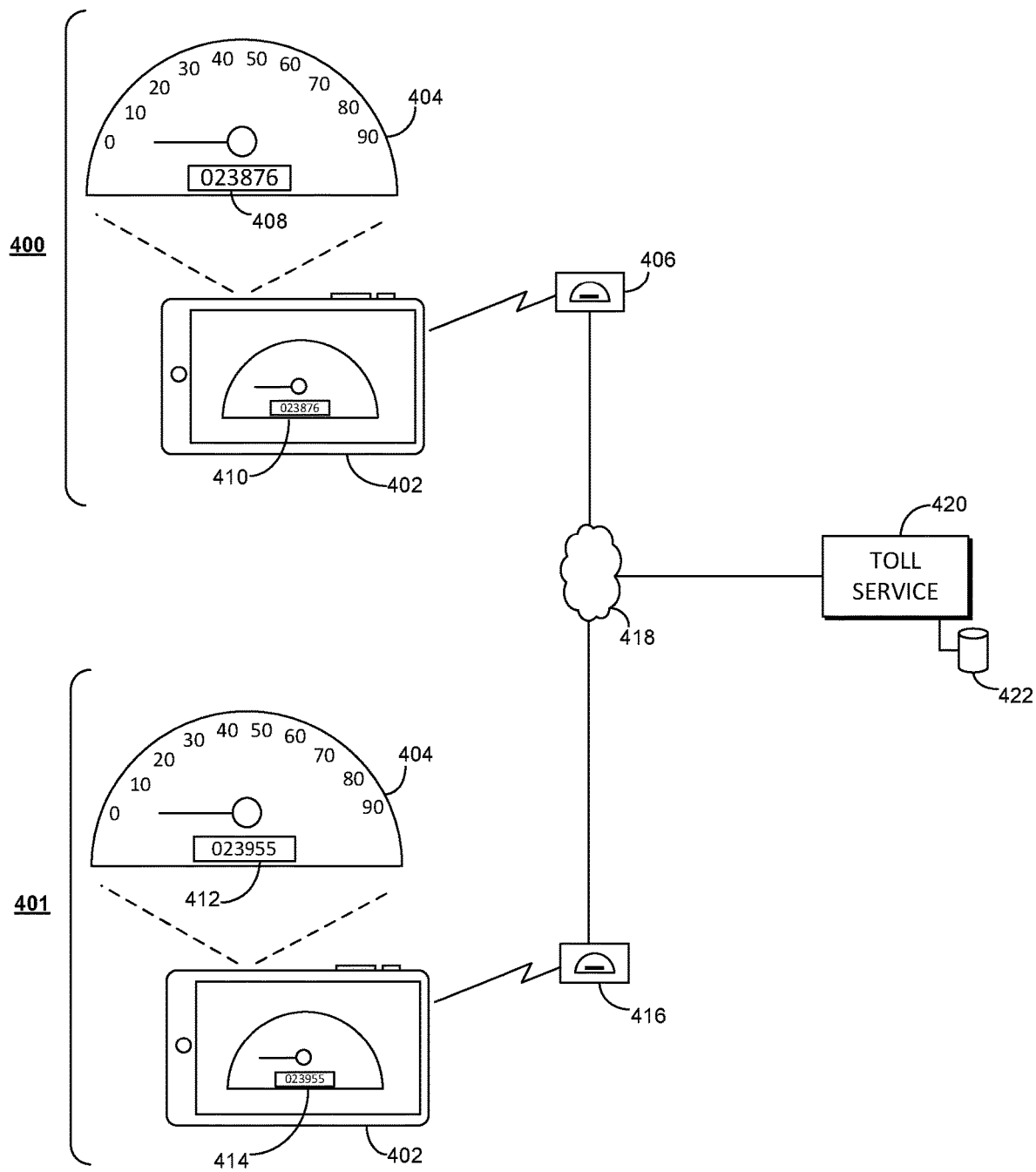
FIG. 4 is a time difference diagram showing a vehicle odometer at different times and showing different distance values that are photographed at the different times to determine a road usage charge in accordance with some embodiments.

FIG. 4 is a time difference diagram showing a vehicle odometer at different times 400, 401 and showing different distance values that are photographed at the different times 400, 401 to determine a road usage charge in accordance with some embodiments. At time 400 the mobile device 402 is used to capture a first odometer image 406 of an instrument panel 404 of the vehicle, including an odometer 408 showing a first odometer value, which indicate the total distance the vehicle has driven at the point in time when the image is captured. The odometer 408 is not to be confused with a "tripometer" which is a resettable distance value, which is commonly available in passenger and other vehicles. The display of the mobile device 402 can show a display 410 of the instrument panel as the mobile device is being operated to capture the first odometer image 406. Once captured or taken, the first odometer image 406 is transmitted to a service 420 over a network 418. The service 420 can be a toll service, which manages an account associated with the vehicle for automated payment of tolls. The network 418 can include cellular telephony system networks and wide area data services networks such as the Internet. The toll service 420 manages a database 422 of account information, and includes one or more servers which are hardware components including one or more processors which perform or execute instruction code. The instruction code can be loaded and instantiated from a computer program product that comprises a non-transitory computer readable storage medium, and when executed by the one or more processors causes the server to perform the functions, methods, and operations as taught herein.

At time 401, which is subsequent to time 400, the user of the mobile device 402 operates the mobile device 402 to capture a second odometer picture 416, which a second odometer value 412. The second odometer image 416 can be seen on a display 414 of the mobile device 402 while being captured. The first and second odometer values are used, at least in part, to determine an actual distance travelled by the vehicle, and the resulting road usage charge and fuel tax paid. The service 420 can then credit or debit an account associated with the vehicle accordingly. The system, such as toll service 420, retains the second or most recent odometer value. If a subsequent odometer value is determined to be less than the stored prior odometer value, the system can issue an error message. Furthermore, it is contemplated that the image of the instrument panel having the odometer in view can be stored and compared to subsequent image to ensure sufficient correlation between image to assure they are from the same vehicle (matching PAN MAC address) using known image comparison techniques at the system. If the system issues an error message upon attempting to process a received image, the user of the mobile device, upon receiving the error message, can attempt to rectify the cause of the error.

Figure 5:
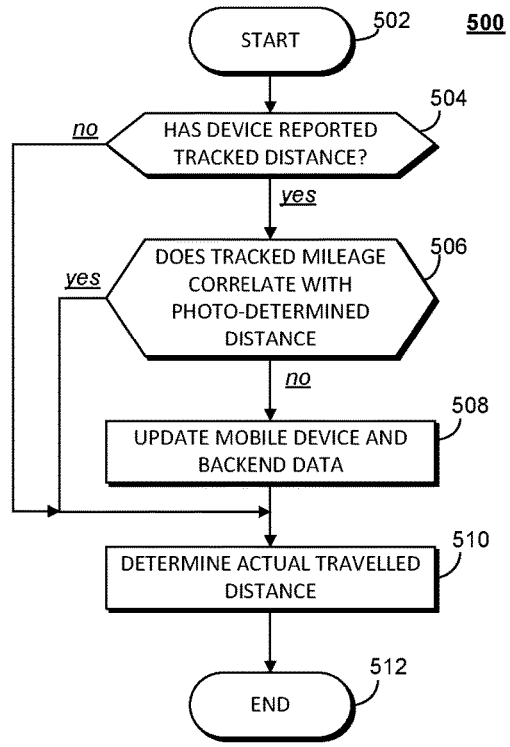
FIG. 5 is flow chart diagram of method of processing odometer photographs for determining a road usage charge in accordance with some embodiments.

FIG. 5 is flow chart diagram of method 500 of processing odometer photographs for determining a road usage charge in accordance with some embodiments. Since the mobile device can track the distance travelled by the vehicle while paired with the vehicle, but may not always be present or turned on while in the vehicle, the distance value produced by the mobile device can be erroneous, and which is why it is but one way used to determine distance travelled by the vehicle, and other means can be used as well to give assurance that the distance determination by the system is reasonably accurate. At the start 502, the mobile device has reported to the system (e.g. to a server of the system) successive images showing the vehicle odometer taken using an application executed on the mobile device that requires the mobile device be paired with the vehicle when the image is captured. In process 504 the method 500 determines whether the mobile device has also reported tracked distance information in addition to other distance information such as odometer images. If so, then in process 506 the method 500 determines whether the reported tracked distance correlates with that determined by the system from the odometer images. If they do correlate, then the method proceeds to process 510 and determines the actual distance travelled to be that indicated by the tracked distance information and the comparison of the odometer images by the system. If the reported tracked distance value and the distance value determined from the odometer images do not correlate, then the system has to determine which of the two values is more accurate. In most cases when the tracked distance reported by the mobile device does not correlate with the distance determined by the system from odometer images, it is because the mobile device was either off or not in the vehicle (or the mobile device's PAN transceiver was turned off) while the vehicle was travelling for at least some of the time the vehicle was travelling. In such a case the system can use the distance determined from the odometer images as being more reliable, and in process 508 the system can update the mobile device and the system's backend server with an indication of the vehicle's total distance value. In some cases a user may attempt to trick the system by using the mobile device to capture an image of a printed image of the odometer with a lower than actual distance indicated. Thus, if the mobile device has a higher tracked distance than that determined from odometer images, the tracked distance can be used as the actual distance travelled, and the system can issue a warning message to the mobile device. Once the actual distance travelled is determined in process 510 the method ends 512, until it needs to be repeated at a subsequent time.

To ensure reliability of distance determinations, it is further contemplated that the service operating the system can have stations where a vehicle operator can have the vehicle odometer inspected by personnel working for the service, or for agents of a partner service that can access the system, and any errors can be rectified by personnel upon verifying the actual distance travelled by the vehicle. In some embodiments the system can issue messages to the mobile device indicating that the vehicle should be brought to such a station for inspection when there appear to be significant and/or repeated errors in distance determinations to ensure proper payment of road usage charges. Individuals that have too many errors or inconsistencies can have their service suspended, requiring them to have the vehicle inspected or have a permanent GPS tracking device placed in their vehicle.

Figure 6:
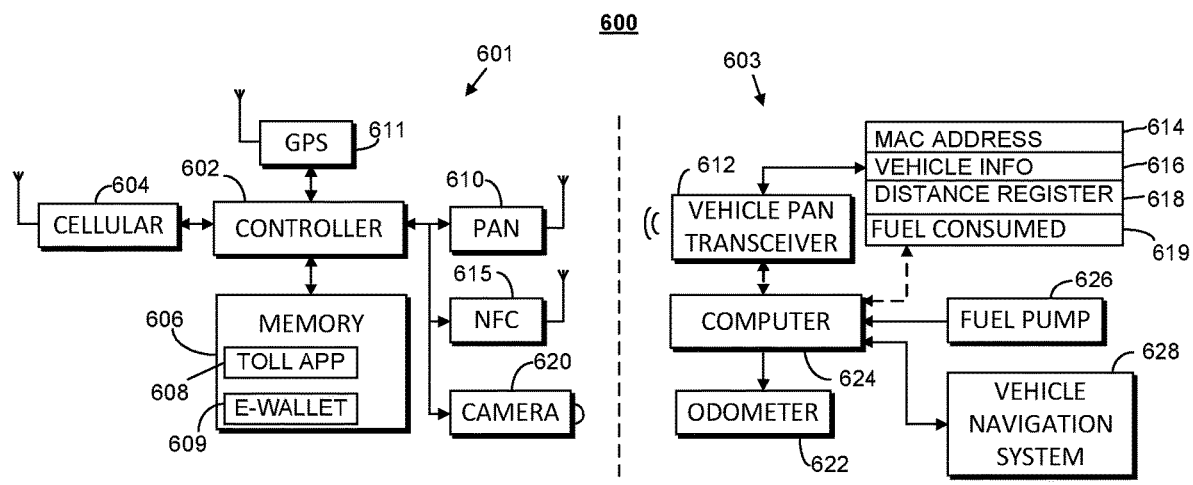
FIG. 6 is a block diagram of a mobile device and vehicle in accordance with some embodiments.

FIG. 6 is a block diagram 600 of a mobile device 601 and vehicle 603 in accordance with some embodiments. The mobile device 601 includes a controller 602 such as a microcontroller or microprocessor. The controller 602 is coupled to several other component to operate, supervise, and interact with those components, in accordance with instruction code executed by the controller. Thus, the controller is coupled to one or more memory components 606, which represents an aggregate of memory components which can include read only memory (ROM), random access memory (RAM), bulk storage memory, flash memory, and so on. In addition to the operating system and various other instruction code components, the controller instantiates and can occasionally execute a toll application 608. The toll application 608 is one example of an application that can be used by the mobile device 601 to report distance information and/or odometer image to the system that maintains an account associated with the vehicle, and can be used additionally to manage automated payment of vehicular tolls. The controller 602 is further coupled to a cellular radio transceiver 604 that can be used for voice telephone calls as well as mobile data services as is known. The controller 602 is further coupled to a PAN transceiver 610 and a camera 620.

The vehicle 603 includes a PAN transceiver 612, an odometer 622, a vehicle computer 624, and a fuel pump sensor 626. The vehicle PAN transceiver 612 can communicate information including a MAC address 614 of the PAN transceiver 612. The MAC address 614 is used by the toll application 608 to ensure that the mobile device 601 is within sufficient proximity of the vehicle 603 to ensure that information collected and reported is produced while in the presence of the vehicle 603. The vehicle PAN transceiver 612 in some embodiments can also provide vehicle information 616 such as make and model of the vehicle. In some embodiments the vehicle 603 can provide direct odometer information in a distance register 618 which duplicates the odometer value in the odometer 622 to the mobile device. In some embodiments the vehicle 603 can determine an amount of fuel used over a period of time using the fuel pump or fuel pump sensor 626 so that the amount of fuel used can be reported to the mobile device 601, which can in turn relay the fuel consumption information to the system for determination of the fuel tax in settling the road usage charge. The amount of fuel used can be stored in a fuel use register 619, which can be reset when the vehicle 603 reports fuel usage to the mobile device 601. The vehicle computer 624 can operate, supervise, or otherwise interact with the PAN transceiver 612, instrumentation including the odometer 622, vehicle sensors such as the fuel pump 626, and it can provide information to the vehicle PAN transceiver 612 that can be stored in a buffer or register (e.g. 618) for transmission to the mobile device 601 upon request or as an event-driven transmission. The vehicle computer 624 can indirectly or directly write information into registers 618, 619, for transmission by the vehicle PAN 612.

The controller 602, upon executing the toll application 608, for reporting distance information of the vehicle 603, can ensure that the mobile device 601 is paired with the vehicle PAN transceiver 612 by querying the mobile device PAN transceiver 610. The toll application 608 can also operate the camera 620 while the mobile device 601 is paired with the vehicle 603. The mobile device 601 can also include a GPS receiver 611 that the toll application 608 can access to produce distance travelled information. Thus, the toll application 608, or other suitable equivalent road usage application, can collect odometer images and location information while the mobile device 601 is paired with the vehicle PAN 612, and report that information over the cellular transceiver 604 to the system for processing and road usage settlement. In some embodiments the mobile device 601 can include instruction code for an e-wallet application 609, which records electronic purchases and produces electronic, authenticated digital receipts. Payment can be facilitated by using a near field communication (NFC) transceiver 615. In some embodiments the e-wallet application 609 can synchronize with an e-wallet account maintained by a receipts or payment service (not shown) to which merchants can transmit a digital copy of a receipt automatically or upon request by a purchaser. Accordingly, e-wallet application 609 can be used to record fuel purchases which can be transmitted to the system (e.g. system 118 of FIG. 1) for determining a road usage settlement amount. It is further contemplated that subscribers to a service such as service 118 of FIG. 1 can opt into a program for offsetting their road usage charge by agreeing to receive advertising in exchange for providing location information to the service, or another service that coordinates such advertising.

In some embodiments where a road usage charge is not assessed when the vehicle is travelling on toll roads, the toll application 608 can determine when the vehicle is travelling on a toll road (e.g. using GPS location information and a mapping function, as is known) and record the distance travelled on toll roads. The distance travelled on toll roads can be deducted from the total distance travelled over a given interval for which a road usage charge is being determined. In some embodiments, the toll paid can be used to reduce the road usage charge. For example, the system 118 of FIG. 1 can automatically pay tolls for the vehicle to a toll agency (e.g. toll agency 128). A portion of the toll can be deducted as a credit towards the road usage charge in some embodiments. Furthermore, in some embodiments, the vehicle 603 can include a navigation system 628 that is capable of determining the distance travelled by the vehicle, as well as whether the vehicle is travelling on toll roads, and communicate such information to the vehicle computer 624 so that it can be provided to the mobile device 601. Distance information can alternatively be provided by the vehicle navigation system 628 in some embodiments, and the vehicle navigation system 628 or the mobile device 601 can determine a distance travelled on toll roads, or other roadways for which there is no road usage charge (e.g. privately maintained roads, off road, roads outside of the jurisdiction of the governmental entity charging the road usage charge, etc.). In some embodiments the road usage of the vehicle can be spread over multiple jurisdictions. In such cases, the mobile device 601 or the vehicle navigation system 628 can be used to determine the distance travelled in each different jurisdiction so that, for example, road usage charges for each different jurisdiction can be determined, and to ensure that the vehicle operator is not over-paying road usage fees for any one jurisdiction.

The embodiments provide, among other benefits, the benefit of not having to install a GPS or other tracking device into the user's vehicle. Furthermore, embodiments allow a user to settle road usage charges using the toll account associated with the vehicle, including receiving refunds from fuel tax paid for fuel to operate the vehicle, and to pay deficits when the road usage charge exceeds the fuel tax already paid by the vehicle operator. Thus embodiments avoid concerns over privacy by only reporting distance information, rather than tracking location, and allow convenient and manageable payment. Governments can continue to collect revenue necessary for road maintenance and other road projects without having to require installation of additional hardware into vehicles.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. The terms "server" or "remote server," as used here refer to any computing equipment that can be accessed via, for example, a network, and that provides a computing service. Instances of the terms "server" or "remote server," either in the specification or the appended claims can refer to the same computing equipment or different computing equipment, and should not be read as necessarily referring to the same computing equipment.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for determining a road usage charge, comprising: at a mobile device, acquiring a first odometer value of an odometer of a vehicle and transmitting the first odometer value to a server that maintains an account that is associated with the vehicle; the mobile device capturing a second odometer value of the odometer of the vehicle and transmitting the second odometer value to the server; determining a distance travelled by the vehicle based on a difference between the second distance value and first distance value; the server confirming the distance travelled based on the first odometer value and the second odometer value; and the server determining a road usage charge based at least in part on the distance travelled.

2. The method of claim 1, further comprising the server transmitting the road usage charge to the mobile device.

3. The method of claim 1, wherein acquiring the first and second odometer values is performed by the mobile device connecting a personal area network (PAN) interface of the vehicle and receiving the first and second odometer values via the PAN interface.

4. The method of claim 1, further comprising the server transmitting a request to the vehicle for the first and second odometer values.

5. The method of claim 1, wherein the distance travelled is determined at the mobile device.

6. The method of claim 1, wherein determining the road usage charge is further based on at least one of a vehicle attribute, a vehicle location, or a vehicle type.

7. The method of claim 6, wherein upon acquiring the first and second odometer values, further acquiring a first location data indicating a first location of the vehicle when the first odometer value is acquired, acquiring a second location data indicating a second location of the vehicle when the second odometer value is acquired, and associating the first location data with the first odometer value and associating the second location data with the second odometer value.

8. The method of claim 7, further comprising associating a first landmark name with the first location data and first odometer value, and associating a second landmark name with the second location data and second odometer value.

9. The method of claim 8, further comprising using the first location data to query a location database to obtain the first landmark name, and using the second location data to query the location database to obtain the second landmark name.

10. The method of claim 1, further comprising: determining that, between acquiring the first odometer value and acquiring the second odometer value, that the vehicle has travelled on a toll road a toll distance.

11. The method of claim 10, wherein determining the distance travelled comprises deducting the toll distance from a total distance indicated by a difference of the second odometer value and the first odometer value.

12. The method of claim 10, wherein determining the road use charge is done by excluding the toll distance from the total distance.

13. The method of claim 10 wherein determining that the vehicle has travelled on the toll road is performed by the mobile device.

14. The method of claim 10, further comprising: the server maintaining a toll account; and settling the road usage charge using the toll account.

15. The method of claim 10, further comprising: determining a distance travelled in each of a plurality of geofenced zones, each one of the plurality of geofenced zones having either a road usage rate or a toll rate; and determining the road usage charge comprises applying the road usage rate to the distance travelled in each one of the plurality of geofenced zones.

16. The method of claim 10, wherein determining the distance travelled and determining that the vehicle has travelled on a toll road a toll distance are both performed by a tolling application on the mobile device.

17. A method for determining a vehicular road usage charge, comprising:
  a mobile phone connecting to a vehicle over a personal area network (PAN);
  the mobile device receiving vehicle information from the vehicle via the PAN;
  the mobile device determining, based on the vehicle information, that the vehicle is associated with a financial account managed by a remote server and that is further managed by the mobile device;
  the mobile device, while connected with the vehicle over the PAN, obtaining a first odometer value of the vehicle;
  the mobile device determining movement of the vehicle and a distance the vehicle has moved while paired with the vehicle over the PAN at the end of a period of time;
  at an end of the period of time, the mobile device obtaining a second odometer value while connected with the vehicle over the PAN;
  the mobile device reporting a distance travelled over the period of time by the vehicle to the remote server; and
  receiving at the mobile device, from the remote server and responsive to reporting the distance travelled over the period of time, a settlement amount based on a road usage charge for an actual distance travelled as determined by the remote server based on the reported distance.

\* \* \* \* \*